(12) United States Patent
Huang et al.

(10) Patent No.: US 10,560,022 B2
(45) Date of Patent: Feb. 11, 2020

(54) SETTING OPERATING POINTS FOR CIRCUITS IN AN INTEGRATED CIRCUIT CHIP USING AN INTEGRATED VOLTAGE REGULATOR POWER LOSS MODEL

(71) Applicant: Advanced Micro Devices, Inc., Santa Clara, CA (US)

(72) Inventors: Wei Huang, Frisco, TX (US); Miguel Rodriguez, Golden, CO (US); Karthik Rao, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/440,838

(22) Filed: Jun. 13, 2019

(65) Prior Publication Data

US 2019/0296644 A1 Sep. 26, 2019

Related U.S. Application Data

(63) Continuation-in-part of application No. 16/130,136, filed on Sep. 13, 2018, now Pat. No. 10,389,251, which is a continuation of application No. 15/793,951, filed on Oct. 25, 2017, now Pat. No. 10,097,091.

(51) Int. Cl.
| | |
|---|---|
| *H02M 3/158* | (2006.01) |
| *G05F 1/575* | (2006.01) |
| *G05F 1/46* | (2006.01) |
| *G05F 1/56* | (2006.01) |
| *H02M 1/00* | (2006.01) |

(52) U.S. Cl.
CPC .......... *H02M 3/1582* (2013.01); *G05F 1/468* (2013.01); *G05F 1/56* (2013.01); *G05F 1/575* (2013.01); *H02M 2001/0022* (2013.01)

(58) Field of Classification Search
CPC ....... H02M 3/1584; H02M 2003/1586; H02M 3/156; H02M 3/158; G05F 1/56; G05F 1/465; G05F 1/468; G05F 1/462
See application file for complete search history.

(56) References Cited

U.S. PATENT DOCUMENTS

| | | | |
|---|---|---|---|
| 2011/0243216 A1 | 10/2011 | Yoshioka et al. | |
| 2015/0137598 A1* | 5/2015 | Hawawini | G01R 31/00 307/31 |

* cited by examiner

*Primary Examiner* — Adolf D Berhane
*Assistant Examiner* — Afework S Demisse
(74) *Attorney, Agent, or Firm* — Park, Vaughan, Fleming & Dowler LLP (57) ABSTRACT

An apparatus includes an integrated circuit chip with a set of circuits having two or more subsets of circuits; an external voltage regulator separate from the integrated circuit chip; two or more integrated voltage regulators on the integrated circuit chip that each provide an input voltage to a respective subset of the circuits; and a controller. The controller determines, using an integrated voltage regulator power loss model, an electrical power loss for the integrated voltage regulators for a first combination of operating points for the subsets of the circuits. The controller then determines, based on the electrical power loss, a second combination of operating points for the subsets of the circuits that includes an adjustment to an operating point for at least one of the subsets of the circuits that compensates for an electrical power loss of the corresponding integrated voltage regulator. The controller sets an operating point of each of the subsets of the circuits based on the second combination of operating points.

22 Claims, 5 Drawing Sheets

SETTING OPERATING POINTS FOR CIRCUITS IN AN INTEGRATED CIRCUIT CHIP USING AN INTEGRATED VOLTAGE REGULATOR POWER LOSS MODEL

RELATED APPLICATION

The instant application is a continuation-in-part of, and hereby claims priority to, pending U.S. patent application Ser. No. 16/130,136, which was filed on 13 Sep. 2018. The instant application also claims priority to U.S. application Ser. No. 15/793,951, which was filed on 25 Oct. 2017, and which issued as U.S. Pat. No. 10,097,091 on 9 Oct. 2018, of which parent application Ser. No. 16/130,136 is a continuation application. Both of these applications are incorporated by reference herein in their entireties.

GOVERNMENT RIGHTS

This invention was made with Government support under the PathForward Project with Lawrence Livermore National Security (prime contract no. DE-AC52-07NA27344, subcontract no. B620717) awarded by the Department of Energy (DOE). The Government has certain rights in this invention.

BACKGROUND

Related Art

In some integrated circuit systems, voltage regulators are used to supply electrical power at specified voltages to some or all of the integrated circuits. For example, voltage regulators can be used to supply electrical power at specified voltages to a system on a chip integrated circuit that includes central processing unit (CPU) cores and graphics processing unit (GPU) cores. While voltage regulators can be used to supply electrical power to integrated circuits, the use of voltage regulators introduces cost and complexity to system design. In addition, the use of voltage regulators can result in power efficiency losses that may reduce battery life in devices that rely on batteries for electrical power and reduce performance within a given power envelope.

One arrangement of voltage regulators consists of a single-stage array of buck regulators (i.e., buck converter circuits) in which each of a set of two or more external buck regulators is allocated for supplying electrical power to a corresponding partition of the integrated circuits (e.g., CPU core, GPU core, etc.). For example, each of the external buck regulators may be mounted to a circuit board along with a chip package that encloses an integrated circuit chip on which the integrated circuits are located. By providing a separate buck regulator for each partition, this arrangement of voltage regulators enables the dynamic selection of a voltage for each partition. One disadvantage of this arrangement, however, is that the arrangement must be provisioned with buck regulators that are able to provide a maximum electrical power for the corresponding partition. Because it is relatively uncommon that the partitions demand maximum electrical power, the buck regulators, which operate most efficiently at higher currents (and corresponding electrical power levels), regularly operate at inefficient lower currents. In addition, provisioning buck regulators as described results in increased circuit board and package cost, as the circuit board and package must be configured with resources for handling the sum of the maximum electrical currents for each of the partitions.

Another arrangement of voltage regulators consists of two stages of voltage regulators, with an external first stage buck regulator providing a fixed intermediate voltage to an array of second stage buck regulators that are fabricated on an integrated circuit chip along with the integrated circuits. Each second stage buck regulator provides dynamically selectable voltages to a particular partition of the integrated circuits (e.g., CPU core, GPU core, etc.). The fixed intermediate voltage is a relatively high voltage level compared to typical integrated circuit voltage requirements, and thus the second stage buck regulators convert/reduce the fixed intermediate voltage to operational integrated circuit voltages for the corresponding partition. In this arrangement of voltage regulators, currents can be provisioned for realistic maximum current scenarios since the first stage regulator and circuit board/package resources are shared by the second stage buck regulators. One disadvantage of this arrangement, however, is that the second stage buck regulators are complex and costly to integrate and fabricate on the integrated circuit chip.

As described above, the various existing arrangements of voltage regulators for providing electrical power to integrated circuits has significant shortcomings. Improving the arrangement and use of voltage regulators is therefore a concern.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of a few of these terms. Note that the terms may have significant additional aspects that are not recited herein for clarity and brevity and thus the description is not intended to limit the terms.

Input voltage: an input voltage (i.e., a supply voltage) is an electrical signal that is supplied to one or more circuits to be used to enable circuit elements to operate. In some cases, the input voltage is supplied at a substantially steady voltage, but with a current that varies as an electrical demand of the dependent circuits varies, e.g., with transient loads on the circuits. For example, a voltage regulator is a circuit that provides an input voltage at a substantially steady voltage, but with a current that varies based on the demand of the dependent circuits. By "substantially steady" voltages, it is meant that an input voltage is, to the extent possible, sustained at or near a configured/given voltage, but that the voltage may vary in certain situations, such as when a transient load occurs on dependent circuits, etc.

Operating point: an operating point includes a setting of one or more circuit parameters with which circuits can be configured for subsequent operation. The circuit parameters can include any parameters that can be set or adjusted, such as voltages, clock frequencies, currents, queue levels, workload types, etc. For example, in some embodiments, each operating point includes, as the circuit parameters, a different frequency-voltage pair. In these embodiments, for each operating point, a specified frequency, e.g., 1.2 GHz or another frequency, is paired with an associated voltage, e.g., 0.9 V or another voltage, so that, when given circuits are set to the operating point, a clock of the given circuits is set to the specified frequency and an input voltage for the given circuits is set to the specified voltage. In some of these embodiments, there are a fixed number of operating points, e.g., 5, 8, or another number, so that only certain operating points are used.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate) to millions or billions of circuit elements (e.g., an integrated circuit memory).

Overview

The described embodiments include an arrangement of voltage regulators for supplying electrical power at substantially steady voltages to a set of circuits on an integrated circuit chip. The arrangement of voltage regulators includes a single external voltage regulator separate from and external to the integrated circuit chip and two or more integrated voltage regulators that are fabricated on, and thus integrated in, the integrated circuit chip. The external voltage regulator provides an output voltage that is received as an input voltage by each of the integrated voltage regulators. The integrated voltage regulators each provide local output voltage that is received as a local input voltage by a different subset of the circuits in the set of circuits. For example, in some embodiments, the set of circuits includes, as a first subset of the circuits, a central processing unit (CPU) core and, as a second subset of the circuits, a graphics processing unit (GPU) core, with each of the CPU core and the GPU core receiving an input voltage that is provided by a different integrated voltage regulator. In some embodiments, the external voltage regulator is a switching voltage regulator and the integrated voltage regulators are low-dropout regulators (LDOs).

In the described embodiments, the external voltage regulator and the integrated voltage regulators are dynamically configurable to provide various output voltages (where "dynamically" means at runtime, as the system operates). For example, in some embodiments, each of the integrated voltage regulators can be separately and independently configured to provide output voltages between 0 V and 1.5 V (or between other voltage values). For instance, in some embodiments, each of the integrated voltage regulators is configured and reconfigured in response to present or projected future input voltage needs of the corresponding subset of the circuits in the set of circuits. Continuing the example, the external voltage regulator can be configured to provide an output voltage between 0 V and 1.7 V (or between other voltage values) based on input voltage demands of the integrated voltage regulators.

In the described embodiments, a controller (e.g., a system management unit, power controller, etc.) sets, and possibly resets, operating points for the subsets of the circuits, each operating point including at least a corresponding frequency and voltage. In other words, in setting/resetting the operating points, the controller causes corresponding functional blocks, circuit elements, and/or devices to provide a specified frequency and voltage to each of the subsets of the circuits. The controller can set/reset the operating points at various times, such as at startup, as a workload profile changes, upon the occurrence of a specified event, at a given time or time interval, etc. In some embodiments, when setting/resetting the operating points, the controller configures the external voltage regulator and the integrated voltage regulators to provide output voltages based on the operating points to which each of the subsets of the circuits is to be set. In other words, the controller determines an operating point for each subset of the circuits, each operating point being associated with an input voltage to be used by/supplied to the subset of the circuits. The controller then configures the external voltage regulator and the integrated voltage regulators to provide corresponding voltages.

In operation, electrical power is lost or consumed in a voltage regulator in proportion to a difference between an input voltage and an output voltage for the voltage regulator. When the electrical power loss in a corresponding integrated voltage regulator is not compensated for in setting operating points for a given subset of the circuits, a particular amount of electrical power may be expected in the given subset of the circuits based on an operating point, but the actual electrical power that is available to the given subset of the circuits is reduced by the loss in the corresponding integrated voltage regulator. The reduced electrical power can result in lower performance of the given subset of the circuits. In the described embodiments, when setting operating points for the subsets of the circuits, the controller compensates for the electrical power loss in the integrated voltage regulators so that the operating point selected for each of the subsets of the circuits results in the subsets of the circuits being provided with desired amounts of electrical power.

In some embodiments, when setting the operating points for the subsets of the circuits, the controller initially determines a first combination of operating points for the subsets of the circuits. For example, in some embodiments, the controller determines an amount of electrical power that is likely to be used by some or all of the subsets of the circuits, such as by determining a past, present, or projected future electrical power consumption of each of the subsets of the circuits, a past, present, or projected future workload of the each of the subsets of the circuits, etc. Based on the amount of electrical power likely to be used by each of the subsets of the circuits, the controller chooses a respective operating point for each of the subsets of the circuits. The controller then determines, using an integrated voltage regulator power loss model, an electrical power loss for the integrated voltage regulators for the first combination of operating points. The controller next adjusts some or all of the operating points from the first combination of operating points in order to compensate for the determined electrical power loss. In other words, the controller adjusts the operating points from the first combination of operating points for some or all of the subsets of the circuits in view of the electrical power loss in the corresponding integrated voltage regulator so that each subset of the circuits is provided with approximately a desired amount of electrical power. For example, in order to increase the electrical power to be provided to a given subset of the circuits, the controller can adjust the operating point for the given subset of the circuits from the first combination of operating points to an operating point with a higher input voltage. At the completion of this operation, the controller has determined a second combination of operating points for the subsets of the circuits that includes the adjustments to the operating point of at least one of the subsets of the circuits. The controller then sets an operating point of each of the subsets of the circuits to a respective operating point from the second combination of operating points. Setting the operating points includes configuring the external voltage regulator and the integrated voltage regulators to provide a corresponding input voltage and local input voltages, respectively, based on the operating points for the subsets of the circuits.

In some embodiments, the integrated voltage regulator power loss model includes an identification of integrated voltage regulator electrical power losses associated with each combination of operating points from among a set of combinations of operating points for the subsets of the circuits. For example, in some embodiments, the electronic device supports using N operating points (with N=2, 5, or another number) for the subsets of the circuits and the integrated voltage regulator power loss model includes an identification of, or value that can be used to determine or compute, the electrical power losses when the subsets are using each combination of the N operating points. In a simple case, if two subsets of the circuits are present in the electronic device and each subset of the circuits is permitted to operate at one of two operating points (and thus there are four combinations of operating points that may be used), the integrated voltage regulator power loss model includes identification of, of values for determining or computing, the four integrated voltage regulator electrical power losses. In some embodiments, the integrated voltage regulator power loss model identifies particular electrical power losses for the each integrated voltage regulator for each combination of operating points, although this is not required (as the identification of some of the electrical power losses may be sufficient to compute or infer other electrical power losses). In some embodiments, the integrated voltage regulator power loss model is or includes one or more of a graph or chart, a table or list, a mathematical expression, a neural network, and/or other type of record.

In some embodiments, the integrated voltage regulator power loss model is generated or trained prior to being used for determining the losses as described herein. In some of these embodiments, the integrated voltage regulator power loss model is generated or trained by a manufacturer or the integrated circuit chip, a system administrator, etc. using one or more theoretical or actual arrangements of circuits. For example, in some embodiments, a test integrated circuit chip having the same design as the integrated circuit chip is operated with different combinations of operating points and the losses in the integrated voltage regulator measured and recorded in the integrated voltage regulator power loss model.

In some embodiments, the electrical power consumption of the electronic device—i.e., of all of the subsets of the circuits as a group—is restricted to being less than a specified amount of electrical power and thus the above-described compensation is performed in view of, and as limited by, the specified amount of electrical power. In these embodiments, the sum of the electrical power consumed by the subsets of the circuits should not be larger than the specified amount of electrical power given the adjustments to the operating points of each of the subsets of the circuits.

Numerous benefits are found when using the above-described arrangement of voltage regulators. For example, by using the integrated voltage regulators to provide input voltages to the subsets of the circuits in the set of circuits of the integrated circuit chip and the external voltage regulator to provide a variable (i.e., not fixed) input voltage to the integrated voltage regulators, the described embodiments are able to adapt the input voltages to the real-time operating conditions of the subsets of the circuits in the set of circuits. As another example, by using the single variable output external voltage regulator and the integrated voltage regulators fabricated on the integrated circuit chip, the described embodiments distribute the voltage regulators in a manner that requires less costly and complex off-chip circuitry. As yet another example, in comparison to certain existing arrangements of voltage regulators, cost can be saved on the package in which the integrated circuit chip is enclosed and the circuit board on which the package is mounted, because the electrical currents are provisioned between the external and integrated voltage regulators according to more realistic operational scenarios. As yet another example, cost and design complexity is avoided with regard to the package and integrated circuit chip, because the dynamically selected output voltage from the external voltage regulator can be configured to meet the specific voltage requirement of the integrated voltage regulators—providing improved electrical power efficiency in specific workload scenarios. As yet another example, by using the integrated voltage regulator power loss model to compensate for integrated voltage regulator electrical power losses when setting the operating points for the subsets of the circuits as described herein, the subsets of the circuits are set to operating points at which specified amounts of electrical power are delivered to the subsets of the circuits, enabling improved operation of the subsets of the circuits. The described embodiments therefore improve the overall electrical power usage and general function of the integrated circuit chip and/or a system in which the integrated circuit chip is used.

System

Figure 1:
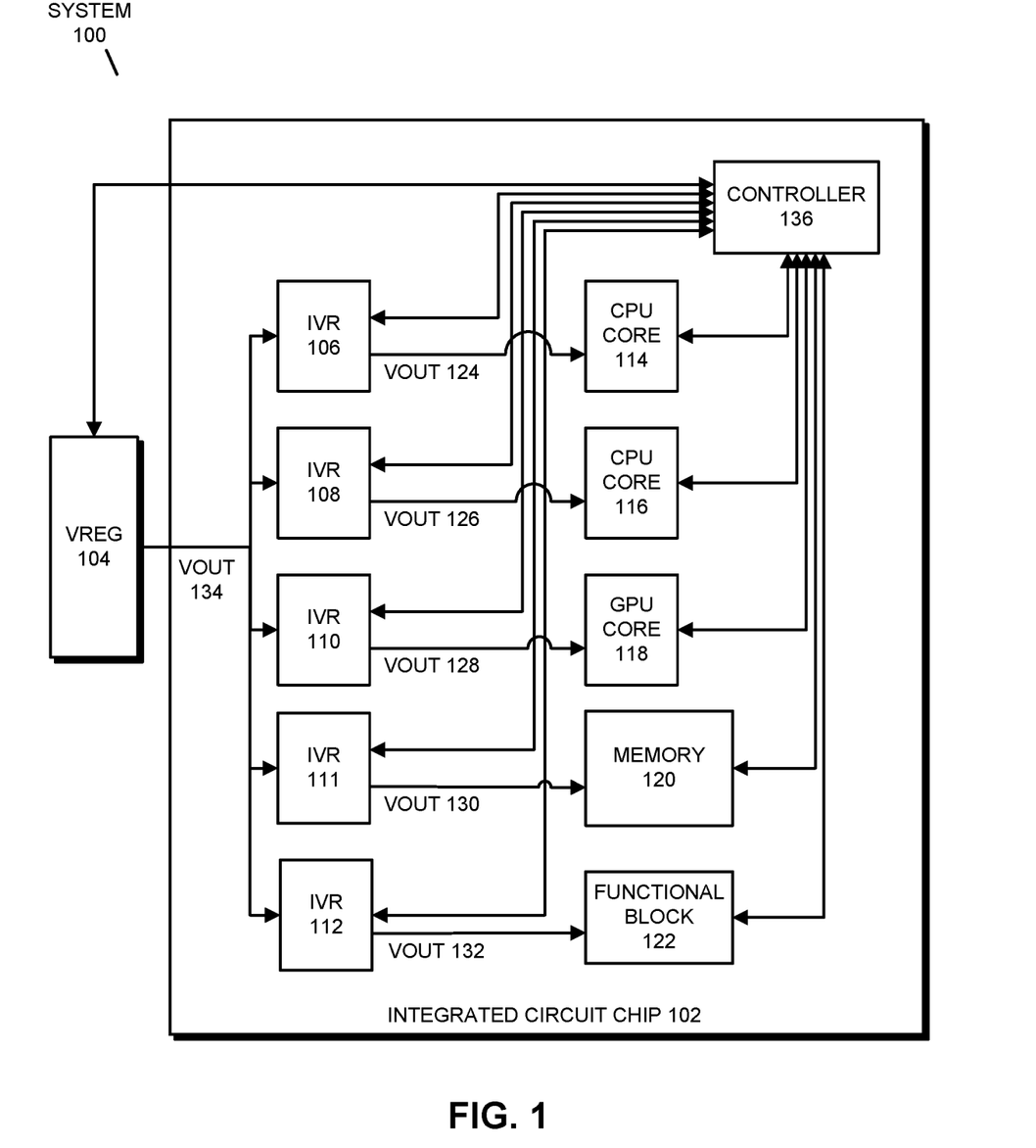
FIG. 1 presents a block diagram illustrating a system in accordance with some embodiments.

FIG. 1 presents a block diagram illustrating a system 100 in accordance with some embodiments. As can be seen in FIG. 1, system 100 includes an integrated circuit chip 102 coupled to a voltage regulator 104 (VREG 104). Integrated circuit chip 102 is a semiconductor chip on which various circuit elements have been fabricated, including integrated voltage regulators (IVR) 106-112, central processing unit (CPU) cores 114-116, graphics processing unit (GPU) core 118, memory 120, functional block 122, and controller 136. CPU cores 114-116 are microprocessor cores that perform various computing operations. GPU core 118 is a graphics processing core that performs graphics processing and/or various other computing operations. Memory 120 is a functional block with memory circuits (dynamic random access memory, flash memory, etc.) that performs operations for storing instructions and data for other circuits and functional blocks in system 100 (e.g., CPU core 114-116, GPU core 118, etc.). Functional block 122 performs corresponding operations such as operations of a network processor, an audio visual processor, a cryptoprocessor, an artificial intelligence (AI) or machine learning (ML) processor, etc.

Voltage regulator 104 is a voltage regulator that provides electrical power at an output voltage, VOUT 134, which serves as an input voltage (i.e., a supply voltage) to integrated voltage regulators 106-112 (and possibly other circuits, which are not shown) on integrated circuit chip 102. For example, voltage regulator 104 may be a switching voltage regulator such as a buck converter, a boost converter, or another type of switching voltage regulator. As described in more detail below, voltage regulator 104 may be dynamically configured and reconfigured to provide various output voltages during the operation of system 100.

CPU cores 114-116, GPU core 118, memory 120, and functional block 122 are part of a "set" of circuits on integrated circuit chip 102, each of CPU cores 114-116, GPU core 118, memory 120, and functional block 122 including or being a different "subset" of the circuits in the set of circuits. For example, in some embodiments, CPU core 114 is a first subset of the circuits in the set of circuits, CPU core 116 is a second subset of the circuits in the set of circuits, GPU core 118 is a third subset of the circuits in the set of circuits, memory 120 is a fourth subset of the circuits, and functional block 122 is a fifth subset of the circuits in the set of circuits. The above-described divisions into subsets of the circuits are but one example, in some embodiments, other divisions are used. For example, in some embodiments, different portions of CPU core 114 are supplied electrical power by different integrated voltage regulators, etc.

Integrated voltage regulators 106-112 are voltage regulators that are configured to provide electrical power at substantially steady local output voltages, each of which serves as an input voltage (i.e., a supply voltage) for a corresponding subset of the circuits in the set of circuits in integrated circuit chip 102. Integrated voltage regulators 106-112 include voltage regulators such as low dropout regulators, switched-capacitor regulators, and/or switched inductor regulators. As can be seen in FIG. 1, integrated voltage regulator 106 provides a local output voltage VOUT 124 that serves as an input voltage for CPU core 114 (i.e., a first subset of the circuits in the set of circuits), integrated voltage regulator 108 provides a local output voltage VOUT 126 that serves as an input voltage for CPU core 116, integrated voltage regulator 110 provides a local output voltage VOUT 128 that serves as an input voltage for GPU core 118, integrated voltage regulator 111 provides a local output voltage VOUT 130 that serves as an input voltage for memory 120, and integrated voltage regulator 112 provides a local output voltage VOUT 132 that serves as an input voltage for functional block 122. As described in more detail below, each of integrated voltage regulators 106-112 may be dynamically and separately configured and reconfigured to provide various local output voltages during the operation of system 100.

The output voltages provided by integrated voltage regulators 106-112 are called "local" in this description in order to distinguish these output voltages from the output voltage provided by voltage regulator 104. The local output voltages are otherwise simply output voltages that are provided to the subsets of the circuits in the set of circuits as described herein.

As described above, voltage regulator 104 and integrated voltage regulators 106-112 can be dynamically configured to provide various output voltages. In some embodiments, system 100 performs the dynamic configuration by determining a local output voltage to be provided by each integrated voltage regulator 106-112 as the local input voltage to the corresponding subset of the circuits. For example, an operating point, which is associated with a particular local input voltage, may be selected for each subset of the circuits based on an electrical power need of each subset of the circuits—as compensated for an electrical power loss in the respective integrated voltage regulator that provides the local input voltage to the subset of the circuits. Continuing the example above, this means that the local output voltage, VOUT 124, for integrated voltage regulator 106 can be determined based on an operating point selected for CPU core 114, the output voltage for integrated voltage regulator 108 can be determined based on an operating point selected for CPU core 116, etc. Based on the local output voltage to be provided by each integrated voltage regulator 106-112, the system determines an output voltage for voltage regulator 104 (which, again, supplies all of integrated voltage regulators 106-112). The output voltage for voltage regulator 104 should be sufficiently high to enable the operation of integrated voltage regulators 106-112, but is generally kept as low as possible to avoid unnecessary electrical power consumption and electrical power loss in integrated voltage regulators 106-112, heat generation, etc. Thus, voltage regulator 104's output voltage is determined based on the highest-demanding integrated voltage regulator 106-112, i.e., the integrated voltage regulator 106-112 that will be providing the highest local output voltage. The system then configures voltage regulator 104 to provide the output voltage and configures integrated voltage regulators 106-112 to provide the respective local output voltage (not necessarily in that order).

In some embodiments, the above-described selection of operating points, and thus the associated selection of local input voltages to be provided by the integrated voltage regulators 106-112, can be performed at various times during the operation of system 100. For example, at startup, as an activity or load of a subset of the set of circuits (again, CPU core 114, CPU core 116, etc.) changes, as a software program commences or changes phases of execution, every N milliseconds (where N is a numerical value), as a specified event occurs while system 100 is operating, when a physical parameter of some or all of system 100, e.g., temperature, etc., reaches a specified level, etc. For example, system 100 may select, for CPU core 114, an operating point having a reduced frequency of a clock in CPU core 114 and an associated reduced local input voltage when the operating point is better for overall system 100 electrical power performance, which means that integrated voltage regulator 106 and possibly voltage regulator 104 can be configured or reconfigured to output corresponding lower local voltage and output voltage, respectively. As another example, system 100 may select, for CPU core 114, an operating point having a reduced frequency of a clock in CPU core 114 and an associated reduced voltage when the CPU core 114 is over-performing, overheating, etc., which means that integrated voltage regulator 106 and/or voltage regulator 104 can be configured or reconfigured to output corresponding lower local voltage and output voltage, respectively.

Returning to FIG. 1, controller 136 is functional block that performs some or all of the operations herein described for using an integrated voltage regulator power loss model for compensating for power loss in integrated voltage regulators when selecting operating points for the subsets of the circuits (and possibly other operations). For example, in some embodiments, controller 136 is a system management unit, a power controller, a voltage regulator controller, and/or another functional block.

In some embodiments, controller 136 receives, retrieves, or otherwise acquires information from some or all of the subsets of the circuits, i.e., CPU core 114, functional block 122, etc., that can be used to determine the electrical power consumption of the subsets of the circuits (e.g., for determining when operating points of the subsets of the circuits are to be configured or reconfigured). In some of these embodiments, controller 136 receives, as the information, a count or estimate of operations being or to be performed in a given amount of time, an indicator of a number of instructions or operations previously executed and/or in a queue, an identification of an idle or busy time, and/or other value(s) representative of a rate at which instructions or operations are being or to be executed or performed. The received value(s) can then be used to compute the electrical power consumption of the subset of the circuits. For example, in some embodiments, a received instruction counter or operation counter is multiplied by a known average per-instruction or per-operation electrical power consumption value for CPU core 116 to estimate the electrical power consumed by CPU core 116. As another example, in some embodiments, a memory operation counter (e.g., a write and/or read counter) is used as an input to a memory electrical power consumption algorithm to estimate the electrical power consumed by memory 120. In some of these embodiments, the information includes an identification of a particular software (e.g., application, operating system routine, etc.) or hardware load being processed, and/or other information that can be used to, via a lookup table or an algorithm, compute an estimated electrical power consumption of the subsets of the circuits. In some of these embodiments, one or more electrical power consumption monitoring circuits in the subsets of the circuits simply provide, as the information, a report of an average electrical power consumption over a specified time, an amount of electrical power consumed since a last report, etc.

In some embodiments, controller 136 may receive, retrieve, or otherwise acquire the information for computing the electrical power consumption of the subsets of the circuits in various ways. For example, in some embodiments, a subset of the circuits, e.g., CPU core 114, writes a value to an accessible register (e.g., a performance counter) or a shared memory location indicating the number of instructions or operations that were, are being, or are to be performed in the subset of the circuits. Controller 136 then accesses/reads the register or shared memory location to determine the information. As another example, in some embodiments, controller 136 communicates a request (e.g., via a system bus, signal lines, etc.) for the information to a subset of the circuits and, in response, receives a response communication from the subset of the circuits with the information. As another example, in some embodiments, an operating system, hypervisor, and/or other software entity communicates the information to controller 136 using a memory location/register, packet, instruction, or other communication mechanism.

In some embodiments, system 100 includes a mounting device (not shown) to which integrated circuit chip 102 and voltage regulator 104 are separately coupled (e.g., mounted, clamped, pressed, adhered, etc.) to provide stability and mechanical support. For example, the mounting device can be one or more of a circuit board, an active or inactive semiconductor interposer, a socket, a bracket, and/or another mechanical mounting device. In these embodiments, the mounting device may include traces, guides, pads, regions, etc. via which input voltages such as VOUT 134 and other electrical signals are communicated between voltage regulator 104 and integrated circuit chip 102.

In some embodiments, system 100 includes a package (not shown) in which integrated circuit chip 102 is enclosed or otherwise mounted. For example, in some embodiments, the package is or includes a pin grid array package, a flat package, a small outline package, a ball grid array package, etc. As is typical with such packages, various pins, leads, solder bumps, regions, etc. and corresponding package-internal routing are provided for communicating electrical signals between integrated circuit chip 102 and devices (circuit boards, interposers, sockets, etc.) to which the package is mounted. In some embodiments, and differently than in some existing systems, the package does not include voltage regulator circuit elements. In other words, the circuit elements of the voltage regulators and the integrated voltage regulators—not including pins, signal routes, traces, guides, regions, etc. used to route input voltages through a package to integrated circuit chip 102—are either entirely external to integrated circuit chip 102, as in voltage regulator 104, or entirely fabricated on integrated circuit chip 102, as in integrated voltage regulators 106-112.

In some embodiments, various signal routes, e.g., wires, guides, communication regions, buses, etc. are coupled between two or more elements in system 100 to communicate electrical signals between the elements. For example, one or more signal routes, which are shown as using a representative single signal line in FIG. 1, may be coupled between controller 136 and CPU core 114 to enable the communication of electrical signals, values, settings, etc. as described herein.

Although various elements are shown in integrated circuit chip 102, in some embodiments, different elements are present in integrated circuit chip 102. Generally, integrated circuit chip 102 includes sufficient elements to perform the operations herein described, including compensating for electrical power loss in integrated voltage regulators when setting operating points for the subsets of the circuits, etc.

Figure 2:
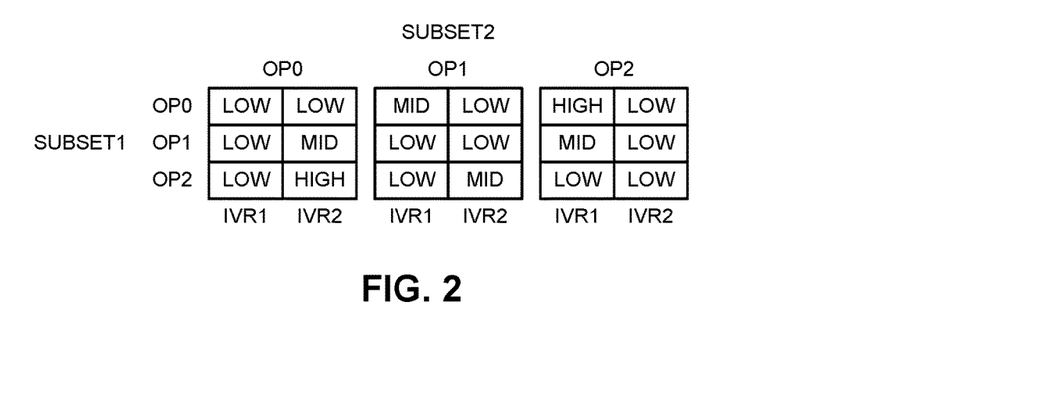
FIG. 2 presents a block diagram illustrating an integrated voltage regulator power loss model that is implemented as a table in accordance with some embodiments.
Figure 3:
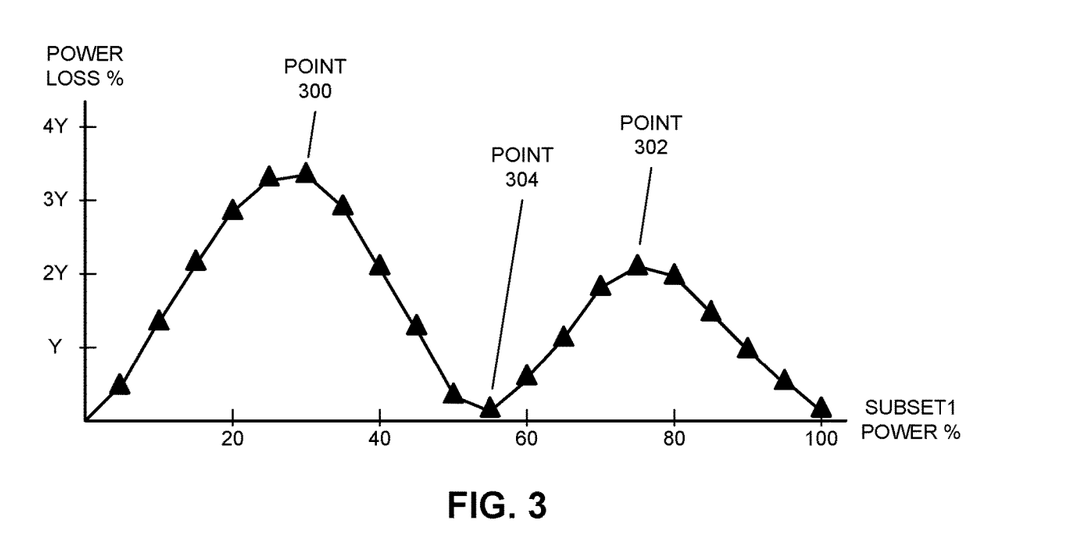
FIG. 3 presents a block diagram illustrating an integrated voltage regulator power loss model that is implemented as a graph in accordance with some embodiments.

System 100 can be, or can be included in, any electronic device that performs computational operations. For example, system 100 can be, or can be included in, electronic devices such as desktop computers, laptop computers, wearable computing devices, tablet computers, virtual or augmented reality equipment, smart phones, artificial intelligence (AI) devices, servers, network appliances, toys, audio-visual equipment, home appliances, vehicles, etc., and/or combinations thereof Integrated Voltage Regulator Power Loss Model In the described embodiments, a controller uses an integrated voltage regulator power loss model to determine electrical power losses for integrated voltage regulators for combinations of operating points of subsets of circuits in a set of circuits that are provided input voltages by the integrated voltage regulators. Generally, the integrated voltage regulator power loss model is a record that can be used for determining (i.e., computing, inferring, estimating, or otherwise identifying) electrical power losses for at least some of the integrated voltage regulators that are associated with corresponding combinations of operating points. The integrated voltage regulator power loss model can be of any form that can be used to determine electrical power losses for the integrated voltage regulators based on the operating points for the subsets of the circuits. For example, in some embodiments, the integrated voltage regulator power loss model is or includes a graph, chart, or multidimensional surface that represents electrical power loss in the integrated voltage regulators for different operating points or combinations thereof. As another example, in some embodiments, the integrated voltage regulator power loss model is or includes a table, a list, or a data structure that includes information about electrical power loss in the integrated voltage regulators for different operating points or combinations thereof. As yet another example, in some embodiments, the integrated voltage regulator power loss model is or includes one or more mathematical algorithms or expressions (e.g., one or more equations used to compute electrical power losses) that can be used to compute the electrical power loss in the integrated voltage regulators for different operating points or combinations thereof. As yet another example, in some embodiments, the integrated voltage regulator power loss model is or includes a neural network that returns information about electrical power loss in the integrated voltage regulators for different operating points or combinations thereof. FIGS. 2-3 present examples of two integrated voltage regulator power loss models in accordance with some embodiments.

For the example in FIG. 2, it is assumed that a set of circuits of an integrated circuit chip includes two subsets, subset1 and subset2, e.g., a CPU core and a GPU core, two different CPU cores, first and second functional blocks, etc. It is also assumed that each of the subsets of the circuits can be operated using operating points OP0-OP2, that OP0-OP2 are the same for each of subset1 and subset2, and that each operating point in order from OP0-OP2 has greater input voltage (e.g., OP0=0.5 V, OP1=1.0 V, and OP2=1.4 V, or other values). Although this example is presented for FIG. 2, in some embodiments, different subsets of circuits and/or operating points are used.

FIG. 2 presents a block diagram illustrating an integrated voltage regulator power loss model that is implemented as a table in accordance with some embodiments. As can be seen in FIG. 2, the integrated voltage regulator power loss model includes, for operating points OP0-OP2, an indication of an expected electrical power loss in the integrated voltage regulator that supplies an input voltage to each of subset1 and subset2. For example, as shown in the top left entries of the table, when subset1 and subset2 are both operated in OP0, the electrical power losses in both integrated voltage regulators are relatively low. This is true because the integrated voltage regulators that supply input voltage to subset1 and subset2 are providing the same output voltage and the electrical power losses across the integrated voltage regulators that supply input voltage to subset1 and subset2 are relatively small. As shown in the bottom left entry of the table, when subset1 is operated in OP2, and thus the highest input voltage, and subset2 is operated in OP0, subset1's integrated voltage regulator experiences relatively low electrical power loss, but subset2's integrated voltage regulator experiences relatively high electrical power loss. This is true because the external voltage regulator is configured to provide a higher input voltage to the integrated voltage regulator that supplies the local input voltage to subset1, which experiences little or no voltage drop in the integrated voltage regulator. The voltage drop across the integrated voltage regulator that supplies subset2, however, is larger, because subset2 is in the lower local input voltage OP0. In some embodiments, the table, i.e., the values of the table, are stored in memory (e.g., memory 120), in a local memory or cache in the controller, and/or in another location.

Although the values low, mid, and high are shown in the table in FIG. 2, in some embodiments other values are stored in the table. Generally, the values in the table can be or include any values that can be used to determine electrical power loss in integrated voltage regulators. For example, in some embodiments, the table stores measured or computed electrical power losses or values representative thereof, such as values in watts of electrical power loss, numbers of units of electrical power loss, rates of electrical power loss, references to a separate table of electrical power losses, etc.

In some embodiments, when using the integrated voltage regulator power loss model shown in FIG. 2 to determine electrical power loss for integrated voltage regulators for a combination of operating points, the controller first determines or acquires the operating points for each subset of the circuits. The controller then looks up the corresponding electrical power loss in the table using the operating points. For example, when subset1 is using OP1 and subset2 is using OP0, the lookup returns low and mid for the losses in the respective integrated voltage regulators.

For the example in FIG. 3, it is assumed that a set of circuits of an integrated circuit chip includes two subsets, subset1 and subset2, e.g., a CPU core and a GPU core, two different CPU cores, first and second functional blocks, etc. It is also assumed that each of the subsets of the circuits can be operated using a number of different operating points, each having an associated input voltage. For the percentage of electrical power shown in FIG. 3, it is assumed that the electronic device is operating using a specified amount of electrical power (e.g., of X watts, where X is 20, 30, or another number of watts) and that the specified amount of electrical power is distributed between subset1 and subset2 in percentages as shown in FIG. 3. In other words, an operating point (including at least a clock frequency and an input voltage) of each the subsets is configured so that the illustrated percentages of the specified amount of electrical power are distributed between subset1 and subset2 as shown in FIG. 3. For example, at the 20% point in FIG. 3, 20% of the specified amount of electrical power is consumed by subset1 and 80% is consumed by subset2 (including electrical power consumed by the corresponding integrated voltage regulators). Although this example is presented for FIG. 3, in some embodiments, different subsets of circuits and/or operating points are used.

FIG. 3 presents a block diagram illustrating an integrated voltage regulator power loss model that is implemented as a graph in accordance with some embodiments. In FIG. 3, the integrated voltage regulator power loss model includes, on the horizontal axis, a percentage of electrical power provided to subset1, and, on the vertical axis, an electrical power loss percentage across the integrated voltage regulators at the corresponding electrical power distribution percentage (where Y equals 1%, 3%, or another value). Generally, the graph shows two different regions as represented by the left and right local maximum of electrical power loss percentage. For the left region, which includes the left (point 300) local maximum of electrical power loss percentage, subset1 is consuming less than half of the specified amount of electrical power and subset2 is consuming the remainder. The operating point of subset1 is therefore set lower (i.e., includes a lower frequency and input voltage) than subset2, and the electrical power loss across subset1's integrated voltage regulator is higher. The electrical power loss percentage in the left region is therefore largely in subset1's integrated voltage regulator. As described above, the loss in subset1's integrated voltage regulator is due to the external voltage regulator being configured to provide a relatively higher input voltage for subset2's operating point while subset1 is using a lower input voltage—and thus experiencing a larger voltage drop. For the right region, which includes the right (point 302) local maximum of electrical power loss percentage, the opposite is true; subset1 is consuming the majority of the specified amount of electrical power and the electrical power loss is largely in subset2's integrated voltage regulator. At point 304, approximately half of the specified amount of electrical power is provided to subset1, with the remainder being provided to subset2. Because the operating points are set with relatively equal input voltages, the electrical power loss across the respective integrated voltage regulators is lower than other points on the graph. In some embodiments, the graph, i.e., the values of some or all of the points of the graph and/or one or more mathematical expressions representing some or all of the points of the graph, are stored in memory (e.g., memory 120), in a local memory or cache in the controller, and/or in another location.

In some embodiments, when using the integrated voltage regulator power loss model shown in FIG. 3 to determine electrical power loss for integrated voltage regulators for a combination of operating points, the controller first determines or acquires the operating points for each subset of the circuits. From the operating points, the controller determines the percentage of the specified amount of electrical power that is being consumed by subset1 (e.g., using one or more tables, relative values of operating points, predetermined electrical power consumption for subsets for corresponding operating points, etc.). The controller then looks up the corresponding electrical power loss in the graph using the percentage or computes the electrical power loss using a corresponding mathematical expression or algorithm representing the graph. For example, when subset1 is using 40% of the specified amount of electrical power, and thus subset2 is using 60%, the lookup or computation returns approximately 2Y % as the loss in the integrated voltage regulators. Recall that the electrical power loss shown in the left region is largely attributed to subset1's integrated voltage regulator, and thus the controller determines that the electrical power loss or some portion thereof is in subset1's integrated voltage regulator.

In some embodiments, the integrated voltage regulator power loss model is generated, prepared, trained, etc. using one or more actual or simulated arrangements of circuits prior to being used for determining the losses as described herein. For example, in some embodiments, the integrated circuit chip, or a test integrated circuit chip having the same design, is operated with different combinations of operating points and the losses in the integrated voltage regulator measured (e.g., via electrical power monitors) or computed (e.g., using performance counters, etc.) and recorded in the integrated voltage regulator power loss model. As another example, in some embodiments, software models of subsets of circuits of a set of circuits and the integrated voltage regulators on an integrated circuit chip or in an integrated circuit chip design are generated, their operation simulated at each combination of operating points, and an electrical power loss in each integrated voltage regulator computed and recorded in the integrated voltage regulator power loss model. As another example, in some embodiments, the integrated voltage regulators themselves are modeled independently with specified loads to determine electrical power losses in the integrated voltage regulators for different input and output voltage combinations and these losses recorded in the integrated voltage regulator power loss model. In some embodiments, an integrated voltage regulator power loss model is generated for and specific to an integrated circuit chip or a set of circuits and/or a particular arrangement of integrated voltage regulators.

Figure 4:
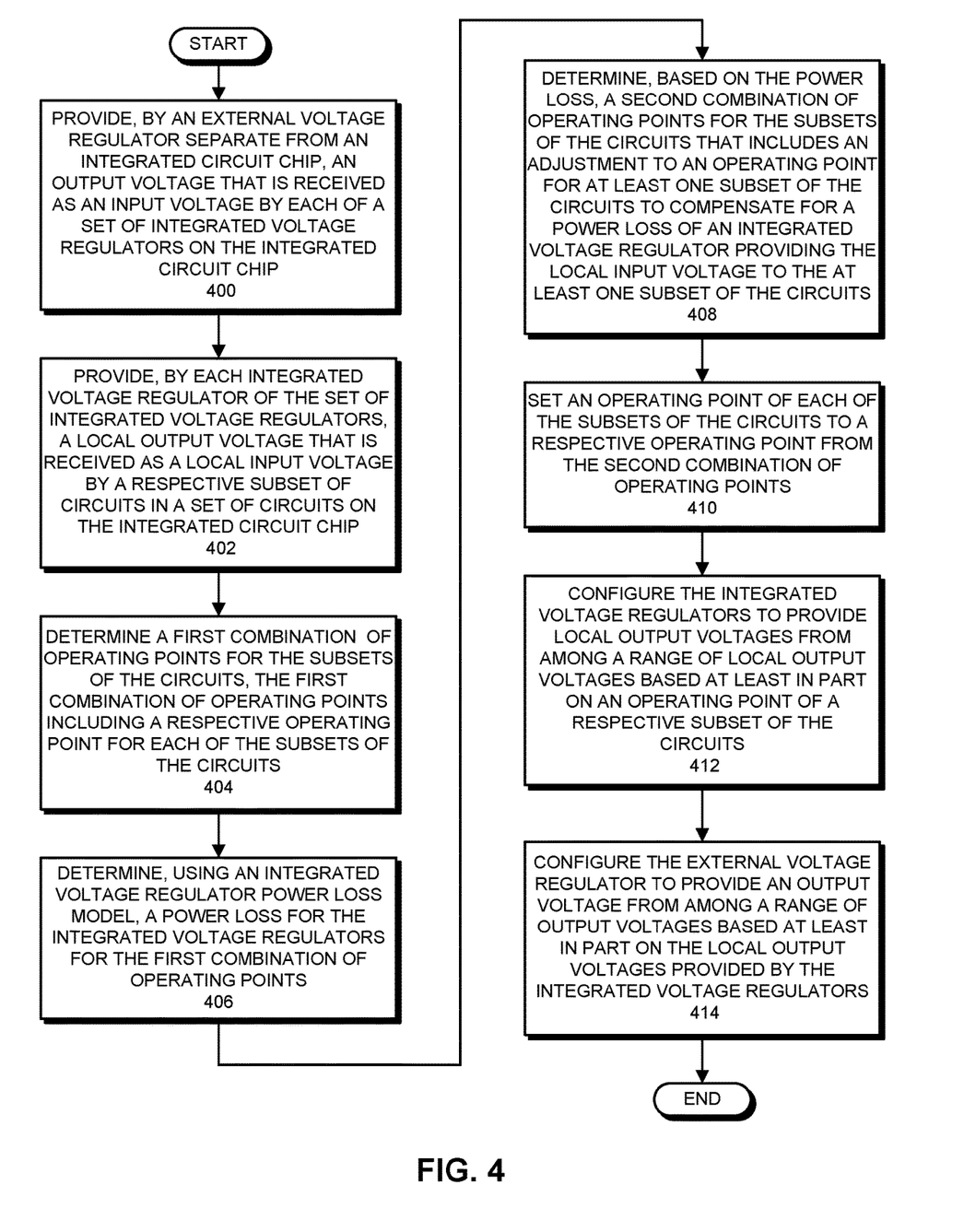
FIG. 4 presents a flowchart illustrating a process for compensating for electrical power losses in integrated voltage regulators when setting operating points for subsets of the circuits in accordance with some embodiments.

Compensating for Integrated Voltage Regulator Electrical Power Losses when Setting Operating Points for Subsets of Circuits The described embodiments perform operations for compensating for electrical power loss in integrated voltage regulators when setting operating points for subsets of circuits in a set of circuits in an integrated circuit chip so that each subset of the circuits is provided with a desired amount of electrical power. FIG. 4 presents a flowchart illustrating a process for compensating for the electrical power losses in integrated voltage regulators when setting operating points for subsets of the circuits in accordance with some embodiments. Note that the operations shown in FIG. 4 are presented as a general example of operations performed by some embodiments. The operations performed by other embodiments include different operations and/or operations that are performed in a different order. Additionally, although certain mechanisms are used in describing the process (e.g., a controller, etc.), in some embodiments, other mechanisms perform some or all of the operations.

The process shown in FIG. 4 can be performed at any time during the operation of a system (e.g., system 100). For example, the process can be performed at or near a startup, at one or more specified, periodic, or repeating times, upon the occurrence of one or more events, when requested by one or more entities (e.g., operating systems, CPU cores, etc.), when a software program starts or changes execution phases, when a particular physical system state (temperature, etc.) is encountered, and/or at other times. In other words, the operating points for the subsets of the circuits are dynamically configurable as the system operates. This can help to ensure that the subsets of the circuits operate at desirable operating points, so that the system consumes electrical power more efficiently (i.e., consumes electrical power commensurate with the operations being performed in the subsets of the circuits), operates at lower temperatures, etc., while also ensuring that the system remains responsive for processing computational loads.

For the operation in FIG. 4, it is assumed that an integrated circuit chip, or the system in which the integrated circuit chip is located, operates using an electrical power consumption threshold. For example, the system may be limited to consuming W watts of electrical power (where W=10, 35, or another amount). In this example, therefore, electrical power is allocated to subsets of circuits in a set of circuits (e.g., a CPU, a GPU, and/or other functional blocks) in view of the electrical power consumption threshold. For instance, assuming that there are two subsets of the circuits, when a first subset of the circuits is allocated X watts (with X<W), the second subset of the circuits is allocated at most W-X watts. Although an electrical power consumption threshold is assumed for the example in FIG. 4, in some embodiments, the system operates with no such threshold.

The process shown in FIG. 4 starts when an external voltage regulator (e.g., voltage regulator 104) separate from an integrated circuit chip (e.g., integrated circuit chip 102) provides an output voltage (e.g., VOUT 134) that is received as an input voltage by each of a set of integrated voltage regulators (e.g., integrated voltage regulators 106-112) on the integrated circuit chip (step 400). The integrated voltage regulators in turn each provide a local output voltage (e.g., VOUTs 124-132) that is received as a local input voltage by a respective subset of the circuits in a set of circuits (e.g., CPU cores 114-116, GPU core 118, memory 120, and functional block 122) on the integrated circuit chip (step 402). In other words, for these operations (i.e., steps 400 and 402), a hierarchical arrangement of voltage regulators that includes the external voltage regulator and the integrated voltage regulators provides electrical power at specified voltages to the subsets of the circuits.

At some point during operation of the system, a controller (e.g., controller 136), determines a first combination of operating points for the subsets of the circuits, the first combination of operating points including a respective operating point for each of the subsets of the circuits (step 404). For this operation, in some embodiments, the controller first monitors an electrical power consumption of the subsets of the circuits or another operational parameter, such as workload, temperature, etc., and determines, based on the monitoring, that the operating points are to be updated for one or more subsets of the circuits. For example, in some embodiments, the controller determines, using performance monitors or other mechanisms, that a given subset of the circuit has been, is, and/or is likely to be busy and therefore more electrical power is to be provided to the given subset of the circuits. As another example, in some embodiments, the controller determines that a given subset of the circuits has been, is, or is likely to be only lightly loaded, despite using a higher-power operating point, and thus reducing the operating point, while decreasing the electrical power available to the given subset of the circuits, will not overly impact the overall performance of the system—and will free the electrical power to be apportioned to another subset of the circuits in view of the threshold. As yet another example, in some embodiments, the controller determines that a given subset of the circuits is approaching a temperature threshold and reducing the operating point, with the associated reduction in electrical power, will help to reduce the temperature of the given subset of the circuits. The controller then determines, based on the electrical power consumption or the other operating parameter, and in view of the electrical power consumption threshold, an operating point that is expected to result in each subset of the circuits having an appropriate amount of electrical power available. For example, in some embodiments, an expected amount of electrical power is computed, known, or estimated for each operating point for each subset of the circuits and the controller selects an operating point for each subset of the circuits accordingly. In these embodiments, the expected amount of electrical power for each operating point may be experimentally determined, measured during operation of the subsets of the circuits, or otherwise computed or estimated. The operating points, determined as described above and taken together, form the first combination of operating points.

Because electrical power loss that occurs in the integrated voltage regulators can reduce the amount of electrical power delivered to the respective subset of the circuits, the controller performs operations for compensating for the electrical power loss. For these operations, the controller first determines, using an integrated voltage regulator power loss model, an electrical power loss for the integrated voltage regulators for the first combination of operating points (step 406). The particular operations performed for determining the electrical power loss for the integrated voltage regulators depends on a form of the integrated voltage regulator power loss model. For example, in some embodiments, the integrated voltage regulator power loss model is or includes a graph and the controller uses one or more of the operating points to acquire, from a corresponding point on the graph, the electrical power loss or one or more values for computing or inferring the electrical power loss. As another example, in some embodiments, the integrated voltage regulator power loss model is or includes a table, the controller uses one or more of the operating points to look up, in the table, the electrical power loss or values for computing or inferring the electrical power loss.

The controller then determines, based at least in part on the electrical power loss, a second combination of operating points for the subsets of the circuits that includes an adjustment to an operating point for at least one subset of the circuits to compensate for an electrical power loss of an integrated voltage regulator that provides the local input voltage (step 408). For this operation, the controller adjusts, in view of the electrical power loss in a corresponding integrated voltage regulator, the operating point of the at least one subset of the circuits in order to ensure that the at least one subset of the circuits receives a desired amount of electrical power. Generally, this operation involves increasing, by approximately the amount of the electrical power loss in the corresponding integrated voltage regulator, the electrical power provided to the at least one subset of the circuits. The controller therefore increases an operating point of the at least one subset of the circuits, i.e., increases a frequency and voltage provided to the at least one subset of the circuits, to adjust the electrical power available to the at least one subset of the circuits. As described above, in some embodiments, the expected amount of electrical power is computed, known, or estimated for each operating point for the at least one subset of the circuits and the controller selects an operating point for the at least one subset of the circuits accordingly.

In some embodiments, when increasing the electrical power provided to the at least one subset of the circuits as described for step 408 causes the sum of the electrical power consumption of all of the subsets of the circuits in the system to surpass the electrical power consumption threshold, the controller decreases the electrical power provided to one or more other subsets of the circuits to offset the increase for the at least one subset of the circuits. For example, in some embodiments, the controller decreases operating points of the one or more other subsets of the circuits to account for the increased operating point of the at least one subset of the circuits, such as by selecting operating points with reduced frequency and voltage. In some embodiments, electrical power capacity is deliberately traded between subsets of the circuits, with some subsets of the circuits having operating points (and thus electrical power) reduced and some having operating points increased. For example, electrical power capacity can be taken from one or more subsets of the circuits that are lightly loaded and allocated to a functional block executing a high intensity or high priority workload.

The controller next sets an operating point of each of the subset of the circuits to a respective operating point from the second combination of operating points (step 410). For this operation, the controller sets a clock frequency and voltage (and possibly other values) for each subset of the circuits corresponding to the operating point. Setting the clock frequency includes operations such as selecting a clock-generating circuit that provides a clock to each subset of the circuits, configuring a clock-generating circuit, gating unused clocks, etc. In some embodiments, when setting the voltage, the controller configures/sets the integrated voltage regulators to provide local output voltages from among a range of local output voltages based at least in part on an operating point of a respective subset of the circuits (step 412). In addition, in some embodiments, the controller configures the external voltage regulator to provide an output voltage from among a range of output voltages based at least in part on the local output voltage provided by the integrated voltage regulators (step 414). The configuring of the external voltage regulator and the integrated voltage regulators is described in more detail below with respect to FIG. 5. Although step 410 is described as "setting" operating points for each of the subsets of the circuits, when an existing operating point for a given subset of the circuits is acceptable, setting the operating point for the given subset of the circuits involves leaving the existing operating point unchanged.

By performing the operations shown in FIG. 4, the controller compensates for the electrical power lost in the integrated voltage regulators. The subsets of the circuits therefore receive amounts of electrical power that are more tailored for the current and/or projected future operations of the subsets of the circuits, which can help to improve the operations of the subsets of the circuits and, more generally, the system.

Configuring Voltages for Voltage Regulators

Figure 5:
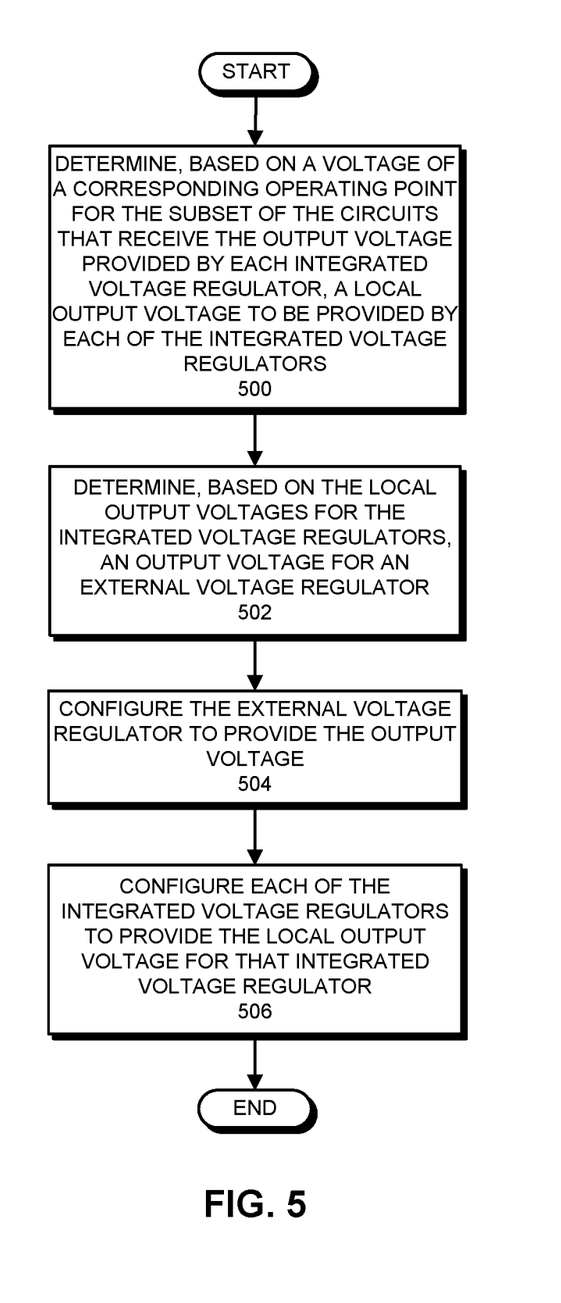
FIG. 5 presents a flowchart illustrating a process for configuring an output voltage for an external voltage regulator and local output voltages for integrated voltage regulators in accordance with some embodiments.

The described embodiments perform operations for configuring the output voltage for an external voltage regulator (e.g., voltage regulator 105) and the local output voltages for integrated voltage regulators (e.g., integrated voltage regulators 106-112) based on operating points of subsets of circuits in a set of circuits. FIG. 5 presents a flowchart illustrating a process for configuring an output voltage for an external voltage regulator and local output voltages for integrated voltage regulators in accordance with some embodiments. Note that the operations shown in FIG. 5 are presented as a general example of functions performed by some embodiments. The operations performed by other embodiments include different operations and/or operations that are performed in a different order. Additionally, although certain mechanisms are used in describing the process (e.g., a controller, etc.), in some embodiments, other mechanisms perform the operations.

For the example in FIG. 5, it is assumed that operating points have been determined/selected for subsets of the circuits and thus the controller performs the operations of FIG. 5 to configure the external voltage regulator and the integrated voltage regulators based on known operating points. For example, in some embodiments, the controller previously performed operations such as those shown in steps 404-410 of FIG. 4 and the operations shown in FIG. 5 are performed as part of steps 412-414.

The operations shown in FIG. 5 start when the controller determines, based on a voltage of a corresponding operating point for the subset of the circuits that receive the local output voltages provided by each of the integrated voltage regulators, a local output voltage to be provided by each of the integrated voltage regulators (step 500). For this operation, the controller determines that each integrated voltage regulator is to output a local output voltage that is equal to the input voltage of the corresponding subset of the circuits. In this way, a separate (but not necessarily different) local output voltage is determined for each integrated voltage regulator based on the voltage of the selected operating point of the corresponding subset of the circuits.

The controller next determines, based on the local output voltages for the integrated voltage regulators, an output voltage for the external voltage regulator (step 502). During this operation, the controller, using a lookup table, an algorithm, and/or other mechanism, determines an output voltage to be provided by the external voltage regulator that is sufficiently high to enable the proper operation of each/all of the integrated voltage regulators, but that is also not substantially higher than necessary. Generally, the integrated voltage regulators need, to enable correct operation, an input voltage that is equal to or higher than the local output voltage. The controller can therefore, in some embodiments, use an algorithm such as an addition (e.g., adding an offset value to the highest integrated voltage regulator output voltage, such as 0.2 V, 0.3 V, etc.) or a multiplication by a scaling value (e.g., multiplying the highest integrated voltage regulator output voltage by a scaling value, such as 1.1, 1.2, etc.) to determine the output voltage for the external voltage regulator. In some embodiments, the controller performs a lookup in a table in which each of a set of local output voltage values is associated with a corresponding output voltage for the external voltage regulator to acquire the output voltage. The controller may also set the output voltage equal to the highest of the local output voltages.

The controller then configures the external voltage regulator to provide the output voltage (step 504). During this operation, the controller, e.g., via a corresponding control signal, sets, adjusts, or otherwise causes circuit elements in the external voltage regulator to commence providing/outputting the output voltage. For example, the controller can set or adjust a bias or reference voltage that is supplied to circuit elements of the external voltage regulator to cause those circuit elements to commence providing the output voltage. As another example, the controller can configure elements of the external voltage regulator, such as amplifiers, resistors, capacitors, inductors, etc. to cause the external voltage regulator to commence providing the output voltage. As another example, the controller can set a value in a register or memory element that is used by one or more control circuits or elements for the external voltage regulator to determine how to set the output voltage for the external voltage regulator, thereby causing the external voltage regulator to commence providing the output voltage.

The controller then configures each of the integrated voltage regulators to provide the local output voltage for that integrated voltage regulator (step 506). During this operation, the controller, e.g., via corresponding control signals, sets, adjusts, or otherwise causes circuit elements in each integrated voltage regulator to commence providing/outputting the corresponding local output voltage. For example, the controller can set a bias or reference voltage that is supplied to circuit elements of a given integrated voltage regulator to cause those circuit elements to commence providing the output voltage. As another example, the controller can configure elements of a given integrated voltage regulator, such as amplifiers, resistors, capacitors, etc. to cause the given integrated voltage regulator to commence providing the output voltage. As another example, the controller can set a value in a register or memory element that is used by one or more control circuits or elements for a given integrated voltage regulator to determine how to set the output voltage for the given integrated voltage regulator, thereby causing the given integrated voltage regulator to commence providing the output voltage.

For the example in FIG. 5, the reconfiguration of the external voltage regulator to provide the output voltage (in step 504) and the integrated voltage regulators to provide the corresponding local output voltages (in step 506) is performed in such a way that unnecessary disruption of local output voltages is avoided during the configuration operation. Generally, this means that the output voltage of the external voltage regulator is not reduced below an output voltage that is sufficient for all of the integrated voltage regulators to continue providing a previous local output voltage—until the integrated voltage regulators are also reconfigured to provide lower local output voltages. For example, in some embodiments, the reconfiguration is performed at substantially the same time for the external voltage regulator and the integrated voltage regulators, so that the integrated voltage regulators demonstrate reduced ill effects (i.e., interruptions or spikes in local output voltage) from the reconfiguration. As another example, in some embodiments, the order of steps 504-506 is reversed so that an integrated voltage regulator's local output voltage is reduced/configured before the output voltage of the external voltage regulator is correspondingly reduced/configured.

Although "configuring" voltages is described in steps 504-506, configuring includes leaving output voltages and local output voltages unchanged when no change is desirable. For example, when the output voltage and/or local output voltages are already properly configured in accordance with the voltages for the various operating points, the "configuring" may consist of leaving the present output voltage and/or local output voltage unchanged.

Selecting from Among Multiple Integrated Voltage Regulators

Figure 6:
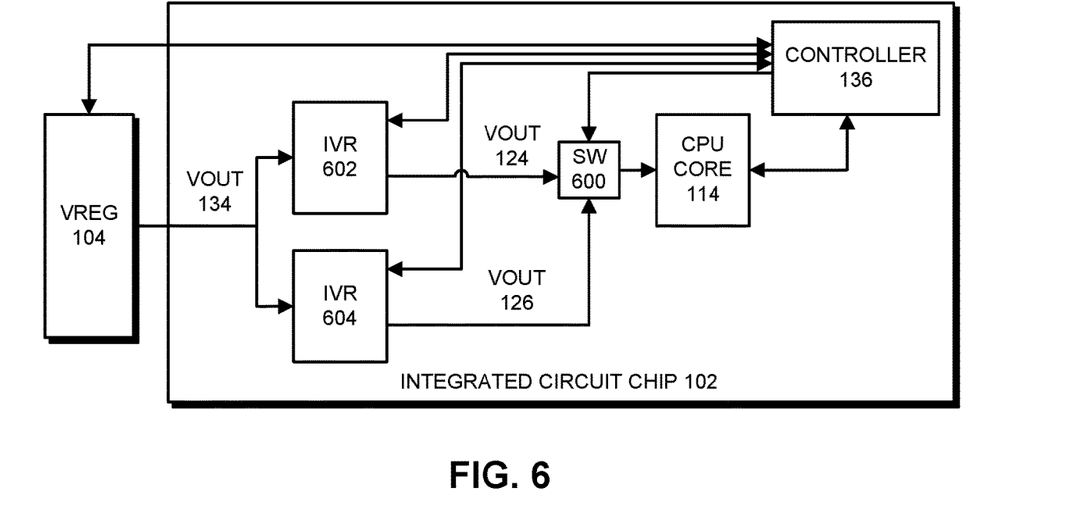
FIG. 6 presents a block diagram illustrating multiple integrated voltage regulators that are selectively coupled to a subset of circuits in accordance with some embodiments.

In some embodiments, the system includes two or more integrated voltage regulators that are each selectively coupled to the same subset of the circuits, with one of the two or more integrated voltage regulators at a time being selected to provide the local output voltage that is received as the local input voltage by subsets of the circuits. FIG. 6 presents a block diagram illustrating multiple integrated voltage regulators selectively coupled to a subset of circuits in accordance with some embodiments. The block diagram in FIG. 6 shows a portion of integrated circuit chip 102; the remainder of integrated circuit chip 102 is not shown for clarity. The elements in FIG. 6 other than switch (SW) 600 and integrated voltage regulators 602-604 perform similar operations to those described for the similarly numbered elements of FIG. 1. Although certain elements are shown in FIG. 6, in some embodiments, different elements and/or different arrangements of elements are present. For example, in some embodiments, integrated voltage regulator 108 and/or other voltage regulators as shown in FIG. 1 are replaced by multiple integrated voltage regulators in an arrangement similar to integrated voltage regulators 602-604 and switch 600 in FIG. 6.

Switch 600 is controlled by controller 136 to selectively couple one of integrated voltage regulator 602-604 at a time to CPU core 114. As used herein, "selectively coupling" indicates that switch 600 is an electronic switch (e.g., a semiconductor switch, a multiplexer, etc.) that can be set in one of two positions or configurations in order to feed a respective one of the two voltages received from integrated voltage regulator 602-604 to CPU core 114.

Integrated voltage regulators 602-604 are voltage regulators, each having similar properties to the integrated voltage regulators of FIG. 1. In some embodiments, each of integrated voltage regulators 602-604 is designed to efficiently output specified ranges of voltage, such as by including particular circuit elements, drivers, etc. in each of integrated voltage regulators 602-604. In some embodiments, the ranges of voltage that each of integrated voltage regulators 602-604 is designed to efficiently output are at least partially non-overlapping—and so each of integrated voltage regulators 602-604 efficiently output different ranges of voltages. As used herein, "output efficiently" means to output a particular range of voltages with relatively lower electrical power loss, less heating, etc. than an integrated voltage regulator that is not so configured. In some embodiments, integrated voltage regulators 602-604 are capable of outputting the similar ranges of voltages, although at least a portion of the ranges of voltages are output inefficiently.

Figure 7:
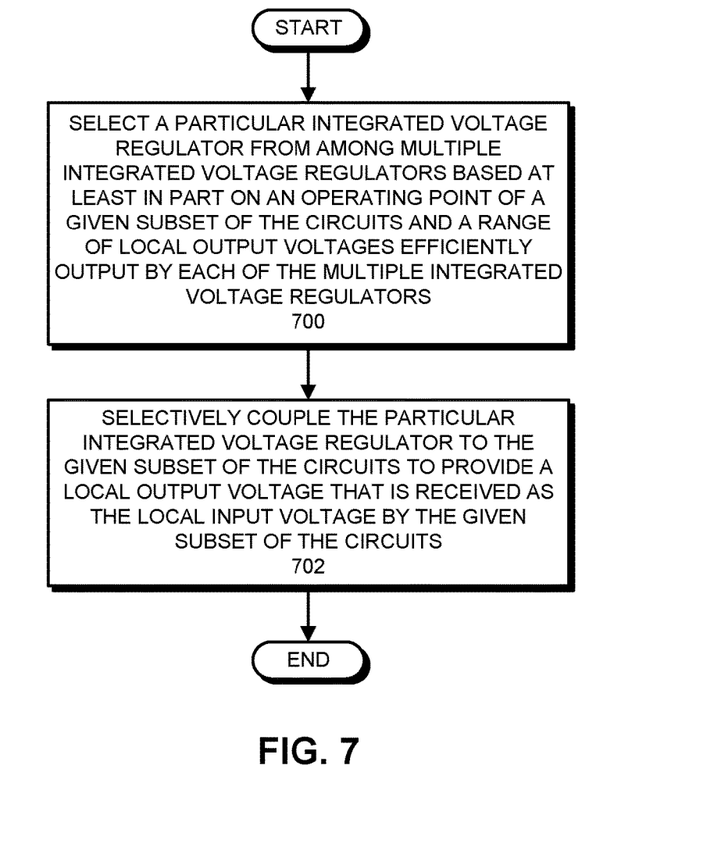
FIG. 7 illustrates a process for selecting one of multiple integrated voltage regulators to provide the local input voltage for a given subset of circuits in accordance with some embodiments.

For multiple integrated voltage regulator embodiments, when configuring the integrated voltage regulators based at least in part on an operating point of a respective subset of the circuits (as shown in FIG. 4, elements 412-414 and FIG. 5), the controller selects one of the multiple integrated voltage regulators that is to be coupled to, and thus provide the local input voltage for, a given subset of the circuits. FIG. 7 illustrates a process for selecting one of multiple integrated voltage regulators to provide the local input voltage for the given subset of the circuits in accordance with some embodiments. Note that the operations shown in FIG. 7 are presented as a general example of functions performed by some embodiments. The operations performed by other embodiments include different operations and/or operations that are performed in a different order. Additionally, although certain mechanisms are used in describing the process, in some embodiments, other mechanisms perform the operations.

As can be seen in FIG. 7, the controller selects a particular integrated voltage regulator from among the multiple integrated voltage regulators based at least in part on an operating point of the given subset of the circuits and the range of local output voltages efficiently output by each of the multiple integrated voltage regulators (step 700). For example, in some embodiments, the controller selects an integrated voltage regulator from among the multiple integrated voltage regulators whose range of local output voltages best matches or fits the operating point (e.g., provides the most leeway in terms of voltage on either side of a voltage for the operating point, etc.). The controller then selectively couples the particular integrated voltage regulator to the given subset of the circuits to provide the local output voltage that is received as the local input voltage by the given subset of the circuits (step 702). In the embodiment shown in FIG. 6, selectively coupling the particular integrated voltage regulator to the subset of the circuits includes setting switch 600 to pass the local output voltage from the particular integrated voltage regulator to the given subset of the circuits—and block the local output voltage from the integrated voltage regulator that is not selected. In some embodiments, the non-selected integrated voltage regulator is powered down to save electrical power.

In some embodiments, a computing device (e.g., system 100, and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations. A computer-readable storage medium can be any device, medium, or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), system management units, power controllers, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., a integrated circuit chip, a controller, and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuit elements that perform the described operations. For example, the circuit elements may include integrated circuits, discrete circuit elements, etc. In some embodiments, the circuits in a functional block include circuits that execute program code (e.g., microcode, firmware, applications, etc.) to perform the described operations. For example, a functional block may include one or more processing pipelines, compute units, accelerators, dedicated processing circuits, etc.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An apparatus that controls voltages, comprising:
an integrated circuit chip comprising a set of circuits;
an external voltage regulator separate from the integrated circuit chip;
a plurality of integrated voltage regulators fabricated on the integrated circuit chip, the external voltage regulator providing an output voltage that is received as an input voltage by each of the plurality of integrated voltage regulators, and each integrated voltage regulator of the plurality of integrated voltage regulators providing a local output voltage that is received as a local input voltage by a respective subset of circuits in the set of circuits; and
a controller that:
determines a first combination of operating points for the subsets of the circuits, the first combination of operating points comprising a respective operating point for each of the subsets of the circuits;
determines, using an integrated voltage regulator power loss model, an electrical power loss for the integrated voltage regulators for the first combination of operating points;
determines, based on the electrical power loss, a second combination of operating points for the subsets of the circuits that includes an adjustment to an operating point for at least one of the subsets of the circuits, the adjustment to the operating point compensating for an electrical power loss of the integrated voltage regulator that provides the local input voltage to the at least one of the subsets of the circuits; and
set an operating point of each of the subsets of the circuits to a respective operating point from the second combination of operating points.

2. The apparatus of claim 1, wherein the controller further:
configures the integrated voltage regulators to provide local output voltages from among a range of local output voltages based at least in part on an operating point of a respective subset of the circuits; and
configures the external voltage regulator to provide an output voltage from among a range of output voltages based on the local output voltages provided by the integrated voltage regulators.

3. The apparatus of claim 2, wherein:
the plurality of integrated voltage regulators comprises at least two integrated voltage regulators that are each configured to output a different range of local output voltages and one of the at least two integrated voltage regulators at a time is selectively coupled to a given subset of the circuits to provide the local output voltage that is received as the local input voltage by the given subset of the circuits; and configuring the integrated voltage regulators based at least in part on an operating point of a respective subset of the circuits further comprises:

selecting a particular integrated voltage regulator from among the at least two integrated voltage regulators based at least in part on an operating point of the given subset of the circuits and the range of local output voltages output by each of the at least two integrated voltage regulators; and selectively coupling the particular integrated voltage regulator to the given subset of the circuits to provide the local output voltage that is received as the local input voltage by the given subset of the circuits.

4. The apparatus of claim 2, wherein the controller further:

determines the local output voltage to be provided by each integrated voltage regulator based at least in part on the operating point of the respective subset of the circuits; and determines the output voltage to be provided by the external voltage regulator based at least in part on the local output voltage to be provided by each of the integrated voltage regulator.

5. The apparatus of claim 1, wherein the controller further:

receives the integrated voltage regulator power loss model, the integrated voltage regulator power loss model having been generated for an arrangement of the plurality of integrated voltage regulators and the subsets of circuits in the set of circuits.

6. The apparatus of claim 1, wherein:

the integrated voltage regulator power loss model comprises a table that includes an identification of an electrical power loss of the plurality of integrated voltage regulators for each combination of operating points from among a plurality of combinations of operating points for the subsets of the circuits; and determining, using the integrated voltage regulator power loss model, the electrical power loss comprises looking up, in the table, the electrical power loss for the first combination of operating points.

7. The apparatus of claim 1, wherein:

the integrated voltage regulator power loss model comprises a graph that includes an identification of an electrical power loss of the plurality of integrated voltage regulators for each combination of operating points from among a plurality of combinations of operating points for the subsets of the circuits; and determining, using the integrated voltage regulator power loss model, the electrical power loss comprises finding, using the graph, the electrical power loss for the first combination of operating points.

8. The apparatus of claim 1, wherein, before determining the first combination of the operating points, the controller further:

determines, based on one or more of an electrical power consumption or an operating mode of some or all of the subsets of the circuits, that the first combination of operating points is to be determined.

9. The apparatus of claim 8, wherein the controller further:

computes the electrical power consumption of the some or all of the subsets of the circuits using one or more electrical power models for the some or all of the subsets of the circuits; or determines the electrical power consumption of the some or all of the subsets of the circuits using electrical power monitoring hardware.

10. The apparatus of claim 1, wherein each operating point of the first combination of operating points and the second combination of operating points is selected from among a plurality of candidate operating points, each candidate operating point including a different combination of an input voltage and a controlling clock frequency.

11. The apparatus of claim 1, wherein some or all of the integrated voltage regulators are low dropout (LDO) regulators.

12. A method for controlling voltages in an integrated circuit chip that includes: a set of circuits; an external voltage regulator separate from the integrated circuit chip; a plurality of integrated voltage regulators fabricated on the integrated circuit chip, the external voltage regulator providing an output voltage that is received as an input voltage by each of the plurality of integrated voltage regulators, and each integrated voltage regulator of the plurality of integrated voltage regulators providing a local output voltage that is received as a local input voltage by a respective subset of circuits in the set of circuits; and a controller, the method comprising:

determining, by the controller, a first combination of operating points for the subsets of the circuits, the first combination of operating points comprising a respective operating point for each of the subsets of the circuits;

determining, by the controller, using an integrated voltage regulator power loss model, an electrical power loss for the integrated voltage regulators for the first combination of operating points;

determining, by the controller, based on the electrical power loss, a second combination of operating points for the subsets of the circuits that includes an adjustment to an operating point for at least one of the subsets of the circuits, the adjustment to the operating point compensating for an electrical power loss of the integrated voltage regulator that provides the local input voltage to the at least one of the subsets of the circuits; and setting, by the controller, an operating point of each of the subsets of the circuits to a respective operating point from the second combination of operating points.

13. The method of claim 12, further comprising:

configuring, by the controller, the integrated voltage regulators to provide local output voltages from among a range of local output voltages based at least in part on an operating point of a respective subset of the circuits; and configuring, by the controller, the external voltage regulator to provide an output voltage from among a range of output voltages based on the local output voltages provided by the integrated voltage regulators.

14. The method of claim 13, wherein the plurality of integrated voltage regulators comprises at least two integrated voltage regulators that are each configured to output a different range of local output voltages, and one of the at least two integrated voltage regulators at a time is selectively coupled to a given subset of the circuits to provide the local output voltage that is received as the local input voltage by the given subset of the circuits, and configuring the integrated voltage regulators based at least in part on an operating point of a respective subset of the circuits further comprises:
- selecting, by the controller, a particular integrated voltage regulator from among the at least two integrated voltage regulators based at least in part on an operating point of the given subset of the circuits and the range of local output voltages output by each of the at least two integrated voltage regulators; and
- selectively coupling, by the controller, the particular integrated voltage regulator to the given subset of the circuits to provide the local output voltage that is received as the local input voltage by the given subset of the circuits.

15. The method of claim 13, further comprising:
- determining, by the controller, the local output voltage to be provided by each integrated voltage regulator based at least in part on the operating point of the respective subset of the circuits; and
- determining, by the controller, the output voltage to be provided by the external voltage regulator based at least in part on the local output voltage to be provided by each of the integrated voltage regulator.

16. The method of claim 12, further comprising:
- receiving, by the controller, the integrated voltage regulator power loss model, the integrated voltage regulator power loss model having been generated for an arrangement of the plurality of integrated voltage regulators and the subsets of circuits in the set of circuits.

17. The method of claim 12, wherein:
- the integrated voltage regulator power loss model comprises a table that includes an identification of an electrical power loss of the plurality of integrated voltage regulators for each combination of operating points from among a plurality of combinations of operating points for the subsets of the circuits; and
- determining, using the integrated voltage regulator power loss model, the electrical power loss comprises looking up, in the table, the electrical power loss for the first combination of operating points.

18. The method of claim 12, wherein:
- the integrated voltage regulator power loss model comprises a graph that includes an identification of an electrical power loss of the plurality of integrated voltage regulators for each combination of operating points from among a plurality of combinations of operating points for the subsets of the circuits; and
- determining, using the integrated voltage regulator power loss model, the electrical power loss comprises finding, using the graph, the electrical power loss for the first combination of operating points.

19. The method of claim 12, further comprising, before determining the first combination of the operating points:
- determining, by the controller, based on one or more of an electrical power consumption or an operating mode of some or all of the subsets of the circuits, that the first combination of operating points is to be determined.

20. The method of claim 19, further comprising:
- computing, by the controller, the electrical power consumption of the some or all of the subsets of the circuits using one or more electrical power models for the some or all of the subsets of the circuits; or
- determining, by the controller, the electrical power consumption of the some or all of the subsets of the circuits using electrical power monitoring hardware.

21. The method of claim 12, wherein each operating point of the first combination of operating points and the second combination of operating points is selected from among a plurality of candidate operating points, each candidate operating point including a different combination of an input voltage and a controlling clock frequency.

22. The method of claim 12, wherein some or all of the integrated voltage regulators are low dropout (LDO) regulators.

* * * * *